United States Patent [19]

Kitagawa et al.

[11] Patent Number: 5,021,260

[45] Date of Patent: Jun. 4, 1991

[54] METHOD OF PREVENTING THE DETERIORATION OF A HARDENED CEMENT-BASED MASS

[75] Inventors: Akio Kitagawa; Takahiro Hori; Yuji Nakamura, all of Funabashi, Japan

[73] Assignee: Nissan Chemical Industries, Ltd., Tokyo, Japan

[21] Appl. No.: 523,416

[22] Filed: May 15, 1990

[30] Foreign Application Priority Data

May 18, 1989 [JP] Japan .................................. 1-125255

[51] Int. Cl.$^5$ .......................... B05D 3/02; B05D 5/10; B05D 1/36; E01C 5/12
[52] U.S. Cl. .................................... 427/140; 427/387; 427/393.6; 427/403; 427/407.1
[58] Field of Search .................. 427/139, 393.6, 397.8, 427/140, 403, 387, 407.1

[56] References Cited

U.S. PATENT DOCUMENTS

| | | |
|---|---|---|
| 3,427,175 | 2/1969 | Angstadt et al. . |
| 3,458,327 | 7/1969 | Fraser . |
| 3,914,476 | 10/1975 | Nitzsche et al. ............... 106/287.12 |
| 4,125,673 | 11/1978 | Roth et al. ........................ 427/393.6 |
| 4,536,534 | 8/1985 | Singer et al. ..................... 427/393.6 |
| 4,559,241 | 12/1985 | Obitsu et al. ..................... 427/393.6 |
| 4,716,051 | 12/1987 | Rödder ............................. 427/393.6 |
| 4,931,314 | 6/1990 | Takakura et al. ................. 427/140 |

*Primary Examiner*—Michael Lusigman
*Assistant Examiner*—Diana L. Dudash
*Attorney, Agent, or Firm*—Oliff & Berridge

[57] ABSTRACT

A hardened cement-based mass having a corrosive metallic material embedded therein, or containing an aggregate reactive with an alkaline substance, is impregnated with an aqueous solution containing 1 to 50% by weight of a dissolved nitrite of an alkali metal or alkaline earth metal and 0.01 to 20% by weight of a dissolved organic silicon compound such as sodium methylsiliconate or potassium methylsiconate, or a dissolved or emulsified polymer thereof, or with a solution prepared by using an aliphatic alcohol having 1 to 3 carbon atoms, and containing 1 to 50% by weight of a dissolved nitrite of an alkali metal or alkaline earth metal and 0.01 to 20% by weight of an dissolved organic silicon compound such as methyltrimethoxysilane or ethyltrimethoxysilane, or a dissolved polymer thereof, and is allowed to dry in the air. Alternatively, the mass is coated with an unsolidified cement paste, mortar or concrete containing 1 to 25% by weight of a nitrite of an alkali metal or alkaline earth metal and 0.01 to 20% by weight of an organic silicon compound such as sodium or potassium methylsiliconate, or a polymer thereof, based on the weight of the cement, which, e.g., the cement paste contains, and, e.g., the cement paste is allowed to harden in the air.

19 Claims, No Drawings

METHOD OF PREVENTING THE DETERIORATION OF A HARDENED CEMENT-BASED MASS

BACKGROUND OF THE INVENTION

1. Field of the Invention

This invention relates to an improvement in the method which prevents the deterioration of a hardened mass of e.g., concrete containing a corrosive metallic material, or an aggregate which is reactive with an alkaline substance, by preventing the corrosion of the metallic material or the reaction of the aggregate with any alkaline substance.

2. Description of the Prior Art

A hardened mass of concrete has numerous pores opening to its surface. It is known that a steel reinforced concrete structure undergoes deterioration outdoors with the passage of time until its surface cracks. More particularly, it is known that the carbon dioxide and water which the air contains enters the concrete through its pores and causes its neutralization and the rusting of steel reinforcing or frame members, and that the expanding rust exerts pressure on the surrounding concrete until the latter eventually cracks.

It is also known that the aggregate which concrete contains reacts with an alkaline substance. This phenomenon also causes an outdoor concrete structure to crack with the passage of time, particularly when it contains as the aggregate crushed stone which has come to be used to make up for the insufficiency of good gravel. The reaction forms a network or tortoise-shell pattern of cracks on the concrete surface.

In either event, the cracking of a concrete structure is most likely to result in its destruction and must, therefore, be prevented as far as possible. It is also highly desirable to estabilish a repairing method which can effectively prevent the progress of deterioration of an existing concrete structure.

Japanese Patent Laid-open Publication No. Sho 60-108385 (108385/1985) teaches that as a method of preventing the deterioration of concrete containing a corrosive metallic material, such as reinforced concrete, it is effective to impregnate its surface with an aqueous solution of nitrite and lithium silicate. Japanese Patent Laid-open Publication No. Sho 61-256951 (26951/1986) teaches that as a method of preventing the reaction of the aggregate in concrete with an alkaline substance, it is effective to impregnate the surface of the concrete with litium hydroxide, lithium nitrite, etc.

Japanese Patent Laid-open Publication No. Sho 63-21270 (21270/1988) discloses an improved method that after a rust proof agent is impregnated from the surface of concrete, epoxy resin is applied on the surface of the concrete.

These methods are, however, far from satisfactory. If an aqueous solution of lithium nitrite is used as the impregnant as taught by Japanese Patent Laid-open Publication No. Sho 61-256951 (26951/1986), the water contained in the concrete is hardly evaporated upon the drying of concrete due to the hygroscopicity of nitrite itself. It if is allowed to dry in the air, its full drying may require a period of as long as several months and it may not be very rare that dew forms on its surface. If its surface is wetted again, as by rainfall, the nitrite may be dissolved in rainwater and fail to provide a long period of protection for the concrete.

If an aqueous solution of nitrite and lithium silicate is used as taught by Japanese Patent Laid-open Publication No. Sho 60-108385 (108385/1985), the silicate forms during the drying of the impregnated concrete an irreversible gel which closes the pores of the concrete and does not allow the nitrite to be readily dissolved in rainwater falling on the concrete surface. Even in this way, however, it is impossible to prevent the dissolution of the nitrite completely, particularly when the concrete has only a small depth of impregnation below its surface.

Japanese Patent Laid-open Publication No. Sho 63-21270 (21270/1988) proposes an improved method in which the surface of concrete which has been impregnated with an aqueous solution of lithium nitrite is coated with an epoxy resin. The epoxy resin, however, prevents the dissolution of the nitrite only until its own deterioration occurs. Therefore, the proposed method is not very effective for protecting concrete against deterioration over a long period of time. Moreover, the method is not recommneded for practical use, since the epoxy resin is expensive and its application to the concrete surface means an additional job.

SUMMARY OF THE INVENTION

It is, therefore, an object of this invention to provide an improved method which is easy to carry out in a short time and yet can prevent almost completely the deterioration of a hardened cement-based mass containing a corrosive metallic material, or an aggregate which is reactive with an alkaline substance, for a long period of time.

This object is primarily attained by a method which comprises impregnating a hardened cement-based mass with an aqueous solution containing 1 to 50% by weight of a dissolved nitrite of an alkali metal or alkaline earth metal and 0.01 to 20% by weight of a dissolved organic silicon compound represented by general formula I, or a dissolved or emulsified polymer thereof:

  (I)

wherein M represents a sodium or potassium atom, and R represents a monovalent hydrocarbon group having 1 to 12 carbon atoms; and allowing the mass to dry in the air.

According to another aspect of this invention, instead of using the aqueous solution, the mass is impregnated with a solution prepared by using an aliphatic alcohol having 1 to 3 carbon atoms which contains 1 to 50% by weight of a dissolved nitrite of an alkali metal or alkaline earth metal, and 0.01 to 20% by weight of a dissolved organic silicon compound represented by general formula II, or a dissolved polymer thereof:

  (II)

wherein $R^1$ represents a monovalent hydrocarbon group having 1 to 12 carbon atoms, and $R^2$ represents a monovalent hydrocarbon group having 1 to 8 carbon atoms.

According to still another aspect of this invention, the surface of the mass is coated with an unsolidified cement paste, mortar or concrete containing, in proportions based on the weight of cement, 1 to 25% by weight of a dissolved nitrite of an alkali metal or alkaline earth metal, and 0.01 to 20% by weight of an organic silicon compound represented by general formula I, or a polymer thereof, and allowing the cement paste, mortar or concrete to harden in the air.

DETAILED DESCRIPTION OF THE INVENTION

The method of this invention is used for preventing the deterioration of a hardened cement-based mass which contains a corrosive metallic material, or an aggregate which is reactive with an alkaline substance (hereinafter referred to as mass or hardened mass). It is a mass resulting from the hardening of a mixture containing a hydraulic cement and owing its bonding strength to the hydration of the cement, for example, a hardened mass of a cement paste, mortar or concrete. The hydraulic cement may be normal Portland cement, rapid-hardening Portland cement, moderate heat Portland cement, or any other hydraulic cement that is usually employed.

The corrosive metallic material means any metallic material that is usually employed for reinforcing a hardened mass of e.g., concrete. Typical examples are wires, rods, or other shapes of steel used in reinforced or steel-framed concrete. The corrosion of the material resulting in the rusting of its surface is not due to the alkalinity of the hardened mass, but occurs when the mass is neutralized, or contains at least 0.01% by weight of a chloride ion.

Examples of the aggregate which reacts with an alkaline substance in a hardened mass are those which are obtained by crushing a variety of minerals, such as opal, chalcedony, siliceous magnesia limestone, rhyolite, andesite, tuff, dacite, trachyte, obsidian, augitite, tridymite, cristobalite, various cherts and flint. The silica, silicate, carbonate, etc. which these minerals contain react in the presence of water with alkaline substances which the mass contains, for example, $Na_2O$, $K_2O$ or other oxide that it contains in the amount of, say, 0.5 to 1.5% by weight of cement, and thereby forms on the surface of the aggregate a substance which increase its volume.

The nitrite which the impregnant contains may be either of an alkali metal such as Li, Na or K, or of an alkaline earth metal such as Be, Mg, Ca, Sr or Ba. Lithium or calcium nitrite is, among others, preferred.

The organic silicon compound of general formula I which the impregnant may contain is also called a siliconate. Examples of the group for which R represents, in formula I, are an alkyl group such as methyl, ethyl, propyl, hexyl or octyl, an aryl group such as phenyl, tolyl, xylyl or naphthyl, and a cycloalkyl group such as cyclohexyl, cyclobutyl or cyclopentyl. It is preferable to use an organic silicon compound which is easily soluble in water, for example, sodium methylsiliconate, sodium ethylsiliconate, sodium phenylsiliconate, potassium methylsiliconate or potassium etylsiliconate. A polymer of any such compound can also be used for the purpose of this invention. A polymer having a low degree of polymerization is soluble in water, and though one having a high degree of polymerization is insoluble in water, it can be used as an aqueous emulsion.

The organic silicon compound of general formula II which the impregnant may contain is also called an organotrialkoxysilane. Examples of the group for which $R^1$ represents in formula II are the same as those for which R represents in formula I, and further include any of those groups that contains a substituent, such as an amino, vinyl, epoxy or mercapto group, or a halogen atom in R. $R^2$ is a group having a fewer carbon atoms than $R^1$. Preferred examples of $R^2$ are an alkyl group such as methyl, ethyl or propyl, an aryl group such as phenyl, tolyl or xylyl, and a cycloalkyl group such as cyclohexyl, cyclobutyl or cyclopentyl. Preferred examples of the compound are methyltrimethoxysilane, methyltriethoxysilane, methyltriisopropoxysilane, ethyltrimethoxysilane, ethyltriethoxysilane and propyltrimethoxysilane. A polymer of any such compound can also be used for the purpose of this invention. A polymer having a low degree of polymerization is used as an alcoholic solution. This solution is preferably prepared by using an aliphatic alcohol having 1 to 3 carbon atoms, for example, methanol, ethanol or isopropanol. Ethanol is, among others, preferred.

The aqueous solution which is used as the impregnant for the purpose of this invention comprises water, a nitrite and an organic silicon compound of general formula I or a polymer thereof. The solution contains 1 to 50%, preferably 5 to 40%, by weight of nitrite, and 0.01 to 20%, preferably 0.1 to 10%, by weight of organic silicon compound or a water-soluble polymer thereof. A polymer which is insoluble in water because of its high degree of polymerization is added in the form of an aqueous emulsion so that its amount to be added becomes 0.01 to 20% by weight in the solution. There is no particular limination to the way in which the solution is prepared. It can easily prepared if the nitrite and the organic silicon compound or water-soluble polymer thereof are dissolved in water, or if an aqueous emulsion of a polymer of the organic silicon compound is mixed with the nitrite or an aqueous solution thereof.

The alcoholic solution which is used as the impregnant comprises methanol, ethanol or propanol, or a mixture thereof, a nitrite and an organic silicon compound of general formula II, or a polymer thereof. The solution contains 1 to 50%, preferably 5 to 40%, by weight of nitrite, and 0.01 to 20%, preferably 0.1 to 10%, by weight of organic silicon compound or an alcohol-soluble polymer thereof. It may contain a small amount of water. It can easily be prepared by dissolving the nitrite and the organic silicon compound or alcohol-soluble polymer thereof in an aliphatic alcohol having 1 to 3 carbon atoms or a mixture of two or more such alcohols, though any other method may, of course, be employed without limitation in particular.

The hardened mass to be treated can be easily impregnated with the aqueous or alcoholic solution by an ordinary method, for example, by dipping the mass in the solution, or coating its surface with the solution. The mass which has been impregnated with the aqueous solution is preferably caused to dry, while absorbing carbon dioxide, of which a preferred source of supply is air. For example, therefore, it is allowed to dry in the air. It dries usually in about one day, or in about a week even at the longest. The mass which has been impregnated with the alcoholic solution is preferably allowed to dry in the air, while absorbing water from the air in the beginning. It also dries in about one to seven days.

The unsolidified cement paste, mortar or concrete which is used for the purpose of this invention is prepared from an ordinary mixture which is obtained by mixing an ordinary hydraulic cement, such as normal, rapid-hardening or ultraquick-seeting Portland cement, jet cement or blast furnace cement, with water and the other constituents as reqruied. It preferably contains, in proportions based on the weight of the cement, either 1 to 25% by weight of lithium, sodium, potassium or barium nitrite, or 1 to 7% by weight of calcium nitrite, and 0.01 to 20% by weight of an organic silicon compound having general formula I as shown above, or a polymer thereof. It can be easily prepared if the above-described amount of the nitrite and that of the organic silicon compound or polymer thereof are mixed with the cement paste, mortar or concrete, etc. when the latter are mixed to form a paste, etc. The unsolidified cement paste, mortar or concrete can be easily applied to the surface of a hardened mass by an ordinary method, for example, spraying it, or using a trowel. It is preferably applied to form a coating having a thickness of, say, 1 to 50 mm. The coating is preferably allowed to cure in the air.

If a hardened mass which has been impregnated with an aqueous solution containing a nitrite alone is allowed to dry in the air, it is not unusual that its full drying takes a period of as long as several months, while the formation of dew on its surface is also likely to occur, as has already been pointed out. On the other hand, a hardened mass which has been impregnated with the aqueous or alcoholic solution according to this invention becomes fully dry if it is left to stand in the air for a period of only one day, or a week at the longest. This is a surprising result of this invention.

The suprisingly quick drying of the mass treated by the method of this invention is probably due to the fact that a hydrophobic layer is formed on the surface of the mass and its vicinity during the initial stage of its drying. It is considered that when the aqueous solution has been used for impregnating the mass, it at first retains its original composition on the surface of the mass and in the pores opening in its surface, but that within a relatively short time of drying, the organic silicon compound which it contains begins to gradually undergo polymerization, as the solution absorbs carbon dioxide from the air, and thereby make an irreversible change into a water-insoluble hydrophobic substance which settles on the surface of the mass and the walls of its pores, while the nitrite remains in solution and passes deeply into the mass. As its drying further proceeds, it is likely that a layer comprising a large deposit of water-repelling substance may be formed on the surface of the mass and in a region of small depth below it, while a thick layer comprising a deposit of nitrile is formed in the mass so as to reach a region having a large depth below its surface.

When an alcoholic solution is used, it is considered that the water which it absorbs from the air during drying causes the organic silicon compound to change into a water-repelling and water-insoluble polymer which forms a water-repelling layer covering the surface of the mass and a region having a small depth below it.

In either event, the water-repelling layer apparently prevents the infiltration of water into the mass, while facilitating the evaporation of water therefrom. Even if the surface of the mass is wetted again after the drying is completed, as by rainwater, there does not occur any dissolution or elution of the nitrite, apparently because the water-repelling layer shuts off any such water.

A similar water-repelling layer is apparently formed when the unsolidified cement paste, mortar or concrete is employed. It is considered that the organic silicon compound which, e.g., the paste contains at first remains dissolved or dispersed in the water which has been used to prepare it, but gradually forms a water-insoluble hydrophobic substance which settles in, e.g., the paste, as it solidifies, while the nitrite still remains dissolved and permeates the surface of a hardened mass into its interior. The hydrophobic substance apparently defines a water-repelling layer upon hardening of the cement paste, mortar or concrete.

The results which the solution or the unsolidified paste or like material exhibits as hereinabove described, however, depends on the proportions of the nitrite and organic silicon compound which it contains, as will hereinafter be discussed.

If the solution contains only less than 1% by weight of nitrite, it does not produce any satisfactory result in preventing the deterioration of a hardened mass. If it contains more than 50% by weight of nitrite, the solution is too viscous to permeate the mass to a satisfactory depth below its surface. Therefore, and also since the nitrite is likely to precipitate at a low temperature, it is not a solution which is suitable for practical use. The solution preferably contains 5 to 40% by weight of nitrite if the nitrite is of lithium. Lithium nitrite is particularly effective for preventing the rusting of the corrosive metallic material and the reaction of the aggregate with an alkaline substance.

If the solution contains only less than 0.01% by weight of organic silicon compound or polymer thereof, it fails to exhibit a sufficiently high level of water repellency for preventing the elution of the nitrite from a hardened mass. If it contains more than 20% by weight thereof, the solution is too viscous and is also low in storage stability. A preferred proportion of organic silicon compound or polymer thereof is from 0.1 to 10% by weight.

No unsolidified cement paste, mortar or concrete is effective if it contains only less than 1% by weight of nitrite or only less than 0.01% by weight of organic silicon compound or polymer thereof, based on the weight of the cement which it contains. No paste, mortar or concrete containing more than 25% by weight of nitrite, or more than 20% by weight of organic silicon compound or polymer thereof is desirable, either, since the cement is likely to set too rapidly or slowly. Lithium nitrite is preferably to any other nitrite, as it has a smaller effect on the setting time of the cement. The cement paste, mortar or concrete is preferably applied to form a coating having a thickness of 1 to 50 mm. No coating having a thickness which is smaller than 1 mm is effective. No coating having a thickness exceeding 50 mm is of any meaning, since no proportionally better result can be expected.

The invention will now be described more specifically with reference to a few examples thereof, as well as comparative examples. Description will first be made of the methods which were employed for preparing solutions, etc., and for conducting a series of tests.

(1) Preparation of Solutions:

Three solutions A, B and C, and another three solutions D, E and F were prepared for use in the examples of this invention and the comparative examples, respectively:

A: Solution A was prepared by mixing 950 parts by weight of an aqueous solution containing 30% by weight of calcium nitrite and 50 parts by weight of an aqueous solution containing 20% by weight of sodium methylsiliconate;

B: Solution B was prepared by mixing 950 parts by weight of an aqueous solution containing 25% by weight of lithium nitrite and 50 parts by weight of an aqueous solution containing 20% by weight of sodium methylsiliconate;

C: Solution C was prepared by mixing 950 parts by weight of an ethanol solution containing 20% by weight of lithium nitrite and 50 parts by weight of an ethanol solution containing 10% by weight of methyltrimethoxysilane;

D: Solution D was an aqueous solution containing 30% by weight of calcium nitrite;

E: Solution E was an aqueous solution containing 25% by weight of lithium nitrite; and F: Solution F was a methanol solution containing 20% by weight of lithium nitrite.

(2) Preparation of Hardened Masses of Mortar:

Hardened masses of mortar were prepared as test samples by mixing one part by weight of normal Portland cement, two parts by weight of sand and 0.65 part by weight of water, placing their mixture in a frame, removing it from the frame after one day, and allowing it to cure first in water for 13 days and then in the air for 14 days.

(3) Tests on Hardened Masses of Mortar:

Water absorption test—The test was conducted by dipping a hardened mass of mortar in water at room temperature, removing it from the water after 30 minutes, wiping its surface with a cloth to remove water therefrom, weighing it, and comparing its weight with its original or dry weight to obtain their difference as the amount of water which it had absorbed;

Moisture absorption test—The test was conducted by leaving a hardened mass of mortar to stand in a refrigerator having a temperature of 4° C. for 16 hours, removing it therefrom and immediately putting it in a chamber having a constant temperature of 40° C. and a constant relative humidity of at least 90%, removing it from the chamber after 10 minutes, weighing it, and comparing its weight with its original weight to obtain their difference as the amount of moisture which it had absorbed;

Water repellency test—The test was conducted by causing a drop of water to fall onto the surface of a hardened mass of mortar, and examining its surface for any stain formed by water. The mass was evaluated as having a water-repelling surface when no such stain was found, and as lacking water repellency when such a stain was detected.

EXAMPLE 1 AND COMPARATIVE EXAMPLE 1

Three hardened samples of mortar, which had been prepared as hereinabove described, were dipped in Solution A, removed therefrom after 10 minutes, and left at room temperature for a week to dry, whereby three impregnated samples were obtained. They were used for water absorption, moisture absorption and water repellency tests, respectively. The test results are shown in TABLE 1.

Another three samples were likewise impregnated with Solution B, and still another three samples with Solution C, and all of them were likewise tested. The results are shown in TABLE 1.

COMPARATIVE EXAMPLE 1 was carried out by employing Solution D, E and F, but otherwise repeating EXAMPLE 1 as hereinabove described. The test results are also shown in TABLE 1. For the mere sake of reference, three samples were impregnated with water instead of any solution, and were likewise tested. The results are shown in TABLE 1.

TABLE 1

| Solution | Water repellency | Amount of water absorbed (g) | Amount of moisture absorbed (g) |
|---|---|---|---|
| A | Yes | 0.45 | 0.14 |
| B | Yes | 0.41 | 0.14 |
| C | Yes | 0.67 | 0.21 |
| D | No | 6.45 | 1.23 |
| E | No | 6.12 | 1.16 |
| F | No | 6.36 | 1.21 |
| Water | No | 6.09 | 0.47 |

As is obvious from TABLE 1, the hardened masses of mortar which had been treated with Solutions A to C according to the method of this invention were all found as having a water-repelling surface and hardly absorbed any water or moisture, while all of the comparative samples which had all been impregnated with the nitrite alone absorbed large amounts of water and moisture and failed to present a water-repelling surface.

Other samples were used for examination on the mode of impregnation. Each sample that had been impregnated with Solution A, B or C and allowed to dry was split into two pieces. Water was sprayed onto one of those pieces to determine the depth of a water-repelling layer below the surface of the mass, and an agent capable of identifying a nitrite ion by color was sprayed onto the other piece to determine the depth of permeation of the nitrite below the surface of the mass.

In the sample which had been impregnated with Solution A, the nitrite had a permeation depth of 10 mm and the water-repelling layer had a depth of 3 mm. In the sample impregnated with Solution B, the nitrite had a permeation depth of 10 mm and the water-repelling layer had a depth of 2 mm. In the sample impregnation with Solution C, the nitrite had a permeation depth of 8 mm and the water-repelling layer had a depth of 2 mm.

These results show that, as each impregnated mass of mortar was allowed to dry, subtantially all of the organic silicon compound settled on and near the surface of the mass, but that the nitrite penetrated to a depth which was several times greater than that of the organic silicon compound.

EXAMPLE 2

An impregnated solution for mortar was prepared by mixing 35 parts by weight of an aqueous styrene-butadiene latex having a solid content of 45% by weight and 65 parts by weight of Solution B. Mortar was prepared by mixing one part by weight of normal Portland cement, two parts by weight of sand and 0.55 parts by weight of the impregnant solution. It was placed in a frame, removed therefrom after one day, and allowed for first 14 days of wet curing and then 28 days of air curing to yield a 4 cm cube hardened mass of mortar. The mass was tested as hereinabove described, and was found as having a water-repelling surface, and having absorbed 0.38 g of water and 0.18 g of moisture.

An unsolidified cement paste containing the impregnant solution was applied to form a coating having a thickness of 2 mm on the whole surface of a hardened mass of mortar which had been prepared as described at (2) above, and was left to stand in the air for 14 days. The mass was tested as hereinabove described, and was found as having a water-repelling surface, and having absorbed 0.41 g of water and 0.13 g of moisture.

EXAMPLE 3

This example was directed to a hardened mass of reinforced concrete containing an aggregate reacting with an alkaline substance.

An aggregate was prepared by mixing a coarse aggregate which had been prepared by mixing crushed pieces of orthopyroxene andesite having a diameter of 5 to 10 mm, crushed pieces of the same having a diameter of 10 to 14 mm and crushed pieces of the same having a diameter of 14 to 20 mm on an equal weight basis, and a fine aggregate consisting of river sand available in the Kinu River (Japan). They were mixed to make a mixture having a fineness modulus of 2.8.

The aggregate, normal Portland cement, salt containing 2% by weight of $Na_2O$ based on the weight of the cement, and water mixed together to prepare a concrete mixture containing 310 kg of cement per cubic meter and having a water to cement ratio of 0.5. A polished rod of SGD-3 steel having a diameter of 10 mm and a length of 460 mm was embedded in the concrete mixture to form a 150 mm square and 500 mm long mass of reinforced concrete in which the rod was covered by a concrete layer having a thickness of 20 mm. After one day, the mass was removed from the frame, and was left to cure in the air having a temperature of 38° C. and a relative humidity of 95%. After 60 days, however, the hardened mass of concrete revealed a surface having a network pattern of cracks and cracks due to the rusting of the reinforcing rod.

Another mass of reinforce concrete was likewise prepared, but its curing was discontinued upon passage of 14 days. It was allowed to dry in dry air having a temperature of 20° C., and dipped in Solution B. After 10 minutes, it was removed from the solution and allowed to dry in the air. Then, it was left to stand in the air having a temperature of 38° C. and a relative humidity of 95%. Even after 90 days, the mass did not reveal any crack, and its surface showed water repellency.

What is claimed is:

1. In a method of preventing the deterioration of a hardened cement-based mass having a corrosive metallic material embedded therein, or containing an aggregate which is reactive with an alkaline substance, the improvement which comprises:
    impregnating said mass with an aqueous solution containing 1 to 50% by weight of a dissolved nitrite of an alkali metal or alkaline earth metal, and 0.01 to 20% by weight of a dissolved organic silicon compound represented by general formula I, or a dissolved or emulsified polymer of said compound:

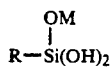
(I)

wherein M represents a sodium or potassium atom, and R represents a monovalent hydrocarbon group having 1 to 12 carbon atoms; and
    allowing said mass to dry in the air.

2. A method as claimed in claim 1, wherein said nitrite is of a metal selected from lithium, sodium, potassium, calcium and barium.

3. A method as claimed in claim 1, wherein said nitrite is of lithium.

4. A method as claimed in claim 1, wherein said hydrocarbon group R is selected from methyl, ethyl, propyl, hexyl, octyl, phenyl, tolyl, xylyl, naphthyl, cyclobutyl, cyclopentyl and cyclohexyl groups.

5. A method as claimed in claim 1, wherein said organic silicon compound is selected from sodium methylsiliconate, sodium ethylsiliconate, sodium phenylsiliconate, potassium methylsiliconate and potassium ethylsiliconate.

6. A method as claimed in claim 1, wherein said solution contains 5 to 40% by weight of said nitrite and 0.1 to 10% by weight of said organic silicon compound, or polymer thereof.

7. In a method of preventing the deterioration of a hardened cement-based mass having a corresive metallic material embedded therein, or containing an aggregate which is reactive with an alkaline substance, the improvement which comprises:
    impregnating said mass with a solution prepared by using an aliphatic alcohol having 1 to 3 carbon atoms, and containing 1 to 50% by weight of a dissolved nitrite of an alkali metal or alkaline earth metal, and 0.01 to 20% by weight of a dissolved organic silicon compound represented by geneal formula II, or a dissolved polymer of said compound:

(III)

wherein $R^1$ represents a monovalent hydrocarbon group having 1 to 12 carbon atoms, and $R^2$ represents a monovalent hydrocarbon group having 1 to 8 carbon atoms; and
    allowing said mass to dry in the air.

8. A method as claimed in claim 7, wherein said nitrite is of a metal selected from lithium, sodium, potassium, calcium and barium.

9. A method as claimed in claim 7, wherein said nitrite is of lithium.

10. A method as claimed in claim 7, wherein said hydrocarbon group $R^1$ is selected from methyl, ethyl, propyl, hexyl, octyl, phenyl, tolyl, xylyl, naphthyl, cyclobutyl, cyclopentyl and cyclohexyl groups, while said hydrocarbon group $R^2$ is selected from methyl, ethyl, propyl, phenyl, tolyl, xylyl, cyclobutyl, cyclopenthyl and cyclohexyl groups.

11. A method as claimed in claim 7, wherein said organic silicon compound is selected from methyltrimethoxysilane, methyltriethoxysilane, methyltriisopropoxysilane, ethyltrimethoxysilane, ethyltriethoxysilane and propyltrimethoxysilane.

12. A method as claimed in claim 7, wherein said solution contains 5 to 40% by weight of said nitrite and 0.1 to 10% by weight of said organic silicon compound, or polymer thereof.

13. In a method of preventing the deterioration of a hardened cement-based mass having a corrosive metallic matrial embedded therein, or containing an aggregate which is reactive with an alkaline substance, the improvement which comprises:
    coating the surface of said mass with an unsolidified cement paste, mortar or concrete containing 1 to 25% by weight of a nitrite of an alkali metal or alkaline earth metal and 0.01 to 20% by weight of an organic silicon compound represented by general formula I, or a polymer of said compound, based on the weight of the cement which said cement paste, mortar or concrete contains:

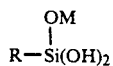

wherein M represents a sodium or potassium atom, and R represents a monovalent hydrocarbon group having 1 to 12 carbon atoms; and allowing said cement paste, mortar or concrete to harden in the air.

14. A method as claimed in claim 13, wherein said nitrite is of a metal selected from lithium, sodium, potassium and barium.

15. A method as claimed in claim 13, wherein said cement paste, mortar or concrete contains 1 to 7% by weight of calcium nitrite as said nitrite based on the cement in said cement paste, mortar or concrete.

16. A method as claimed in claim 13, wherein said nitrite is of lithium.

17. A method as claimed in claim 13, wherein said hydrocarbon group R is selected from methyl, ethyl, propyl, hexyl, octyl, phenyl, tolyl, xylyl, naphthyl, cyclobutyl, cyclopentyl and cyclohexyl groups.

18. A method as claimed in claim 13, wherein said organic silicon compound is selected from sodium methylsiliconate, sodium ethylsiliconate, sodium phenylsiliconate, potassium methylsiliconate and potassium ethylsiliconate.

19. A method as claimed in claim 13, wherein said surface of said mass is coated with a layer of said cement paste, mortar or concrete having a thickness of 1 to 50 mm.

* * * * *